United States Patent
Malone

[11] Patent Number: 5,984,985
[45] Date of Patent: Nov. 16, 1999

[54] MULTIPLE VESSEL MOLTEN METAL GASIFIER

[75] Inventor: Donald P. Malone, Grayson, Ky.

[73] Assignee: Marathon Ashland Petroleum LLC

[21] Appl. No.: 07/838,642

[22] Filed: Feb. 20, 1992

Related U.S. Application Data

[60] Continuation of application No. 07/625,350, Dec. 11, 1990, abandoned, which is a division of application No. 07/542,234, Jun. 21, 1990, abandoned.

[51] Int. Cl.[6] .................................................... C10J 3/20
[52] U.S. Cl. ...................................... 48/25; 48/92; 201/11
[58] Field of Search .............................. 48/25, 92, 192 R, 48/206, 209, 210; 201/11; 202/373; 423/DIG. 20

[56] References Cited

U.S. PATENT DOCUMENTS

| | | | |
|---|---|---|---|
| 4,187,672 | 2/1980 | Rasor | 48/92 |
| 4,338,096 | 7/1982 | Myers | 48/92 |
| 4,436,529 | 3/1984 | Farlsteam et al. | 48/92 |

FOREIGN PATENT DOCUMENTS

1187782  3/1967  United Kingdom .............. C01B 1/16

*Primary Examiner*—Robert J. Warden, Sr.
*Attorney, Agent, or Firm*—Richard C. Willson, Jr.; Stanley M. Welsh; Richard D. Stone

[57] ABSTRACT

A plural zone plant form converting a carbon source to synthesis gas comprising carbon monoxide and hydrogen is disclosed. The carbon source which can consist of coal, automobile tires, or hazardous organic wastes, such as chlorinated biphenyls, polyhaloginated organics, organometallics, organic polymers, and the like is dissolved in a molten bath which can comprise iron in an oxygen deficient zone at one pressure and reacted with water, an oxygen source, or mixtures thereof in at least one other zone at higher temperatures and pressures from that present in the first zone. In one particularly advantageous embodiment, two zones, the first and the second, are at different vertical heights and circulation from one zone to the other occurs as a result of differences in density between the molten bath in the lower zone compared to that in the upper zone.

10 Claims, 6 Drawing Sheets

MULTIPLE VESSEL MOLTEN METAL GASIFIER

This application is a continuation of U.S. Ser. No. 625,350 filed Dec. 11, 1990, which is itself a division of U.S. Ser. No. 542,234 filed Jun. 21, 1990.

BACKGROUND OF INVENTION

The present invention relates to gasification of any carbon containing liquid and/or solid to produce a synthesis gas for both chemical and/or power applications. More particularly the invention relates to the gasification of either coal or an organic waste by means of a molten-metal bath and a source of oxygen. Disposal of used tires or hazardous organic waste without significant emissions and sulfur free synthesis gas from sulfur containing coal are made possible by this invention.

DESCRIPTION OF THE PRIOR ART

U.S. Pat. No. 4,344,773 discloses a plurality of vessels for oxidation, and gasification of carbon and/or carbon containing materials. In a primary vessel containing a molten metal layer, a slag layer and carbonaceous feeds that are to be gasified into CO, carbon monoxide, and hydrogen, oxygen under pressure is introduced into the vessel below the surface of the molten metal bath. Into an interconnecting second vessel, the slag layer is siphoned off and further oxidized by having air blown through the slag layer in a second vessel. In a third vessel, consisting of a granulating tank partially filled with water, the slag is solidified into granular particulates This system provides an advantageous means for producing a substantially pure mixture of only carbon monoxide and hydrogen from the molten bath and a separate stream of sulphur oxides from the slag layer.

U.S. Pat. No. 4,406,666 discloses a device for gasification of carbon by means of a molten metal bath. Specifically disclosed is the formation of a synthesis gas comprising carbon monoxide and hydrogen. Outlets slag, gases, and molten metal are all disclosed. introduction of gases, slag preformers and carbon sources are all introduced below the surface of the molten metal. Specifically disclosed is the ability to tilt the whole vessel so as to permit the nozzles that are otherwise introducing material from below the molten metal surface can be replaced or serviced without shutting down the operation of the device.

U.S. Pat. No. 4,545,786 discloses apparatus for gasifying solid carbonaceous materials. The unique feature of this particular disclosure involves the fact that slag in the same vessel in which the oxygen-containing stream is being introduced is prevented from interfering with the dissolving of the coal in the molten metal by having the oxygen-containing stream jets blow the slag away creating a hot spot in which the coal is introduced. Essentially, there is a gasification occurring in the same vessel as the slag. In other words, the gasification process involving the oxidation of the coal occurs in the same vessel as that containing the slag so that there are three components introduced into the same vessel: the slag component, the oxygen-containing stream and the coke or coal.

U.S. Pat. No. 4,602,574 discloses destruction of toxic organic chemicals in a molten iron bath. Specifically, polychlorinated biphenyls and other organic waste are disclosed to be destroyed in a single vessel. There is no indication of excess pressure being present during the combustion process of the carbonaceous material. Temperatures in excess of 2500° F. are used. Discussed are the introduction of an oxygen containing gas and particulates of coal, as well as toxic wastes. An oxidizing gas is disclosed to be introducible either above or below the molten metal. In addition, alkaline metal carbonates are disclosed in a molten salt process in U.S. Pat. No. 4,246,225 of Grantham. Reference is made to the techniques utilized in steel making along with the appropriate equipment wherein as in Knuppel et al., U.S. Pat. No. 3,706,549 discussed injection of oxygen on organic waste above the surface of molten metal bath to be by means of a lance type introduction, or below the surface by tuyere or port injection are discussed. Not disclosed is use of a two vessel arrangement that provides differences in pressure and primarily dissolving carbon-source in one vessel and oxidation at higher pressures in another one or more vessels.

U.S. Pat. No. 4,681,599 discloses gasification of carbon containing waste in molten metal, wherein a first reaction chamber communicating with a second through openings require that any gas generated in the first zone be bubbled through the molten gas in the second zone to insure complete capture of any gases. Oxygen is introduced into both vessels so that the same vessel in which the carbon refuse is dissolved is also subjected to oxidation. The pressure in both vessels are also substantially the same.

GB 2,088,892 discloses a single vessel in which gasification of solid carbonaceous material is effected by introducing the carbonaceous material onto the surface of the molten metal bath and blowing air through a lance into the molten metal bath.

GB 2,095,282 discloses a method for producing a as containing hydrogen and carbon monoxide in a single vessel by reacting a carbon containing source with oxygen while in contact with molten iron, wherein the gasification media is blown in a stream of gas from above the molten iron and fuel is introduced into the molten iron from underneath the molten iron surface.

GB 2,098,625 discloses a carbon gasification method involving a molten iron bath, wherein the improvement appears to be maintaining a pressure in the range of 4–10 BAR, and especially 6–8 BAR, within an overall range of 2 BAR to 50 BAR. Dust and wear and tear are lessened. A single reaction zone is disclosed and the oxygen and carbon source are introduced below the surface of the molten metal.

GB 2,100,755 discloses a process for coal gasification and the making of pig iron. Disclosed is a composition of synthesis gas formed in a single zone reactor having the following composition: CO:60–75%, hydrogen: 25–35%, and CO2+nitrogen about 5%.

GB 2,189,504 discloses a gasification process for low grade and high grade fuels in two reactor chambers wherein separate molten metal baths are in communication with one another via pathways. The specification discloses that one of the two zones is for a low grade fuel, and the other for a high grade fuel so that any gases produced in one of the zones will be a synthesis gas, whereas that of the other would not be. Heat transfer is effected between the two zones by sharing of molten metal from one zone to the other. The gas phases are kept separate. An example of pressures in the first zone are in the range of 1 to 10 BAR.

NTIS (National Technical Information Service) publication of the U.S. Department of Commerce, #PB-216329 and #PB-211888, both entitled "SO2 Free Two-Stage Coal Combustion Process" which were prepared by the Environmental Protection Agency in August of 1972, discloses: a partition function of sulfur between molten iron and slag; lance position for introducing carbonaceous feeds and the rate at which carbon is dissolved; effect of particle size; rates of reaction between oxygen and dissolved carbon; regeneration rates of slag and process conditions therefor; and lance position for introducing oxygen. Specifically, various slag compositions are discussed in a single zone gasifier.

Chemical Engineering Progress, Volume 69, #3, pp. 54–55, discloses an article entitled "Two-Stage Coal Combustion Process" wherein molten iron gasification is disclosed to produce essentially SO2 free off gas for use in boiler plants. Also disclosed in the article is the desulfurization of sulfur bearing slag.

SUMMARY OF THE INVENTION

Briefly, this invention is directed to an at least two zone process involving molten metal to facilitate the reaction of a carbon-containing material to one or more oxides of carbon. The disposition of hazardous waste involving carbon is one particularly important use of this technology. Preferably a synthesis gas, i.e. one consisting essentially of carbon monoxide and hydrogen is produced at high pressure which permits more direct utilization of this gas stream in downstream, e.g. petroleum refinery, operations. Ordinarily in a molten metal bath gasifier, the carbon monoxide and hydrogen produced are at low pressure relative to that required for refinery operations. A particular advantage in the instant invention is the fact that a synthesis gas containing hydrogen in substantial quantities is produced at high pressure. Another advantage of the instant invention, because of the two vessel arrangement and the fact that the oxidation primarily, and preferably exclusively occurs at a higher pressure in a second zone from that in which halides and other heavy metals have already been removed by, for example, a slag layer, is the production of a substantially pure synthesis gas.

A critical difference of the instant process over that of the prior art is that in one zone, the first zone, the carbon source, e.g. carbon-containing material, is introduced into the molten bath with the amount of oxygen available kept substantially below stoichiometric quantities. Into the second zone which is at a considerably higher pressure, substantial quantities, approaching preferably stoichiometric quantities of oxygen are added to ensure complete combustion of at least a substantial portion of carbon-containing materials to CO. Excess quantities of an oxygen-containing stream can be used, but is undesirable because this then will convert any synthesis gas involving CO to $CO_2$ and perhaps even $H_2$ to $H_2O$ which makes it a far less desirable reaction product. In the second zone, water functions as an oxygen-containing reactant available to react endothermically with carbon to form carbon monoxide and hydrogen.

The principal advantages of the instant process are that the synthesis gas removed from the second zone is both substantially pure and at a high pressure. Prior art processes of gasification required pressurization of any synthesis gas produced and often had problems associated with purity.

In preferred embodiments of this invention, flow control is based solely upon density differentials and therefore, no pumps are required. Also, the rate of circulation from one zone to another can vary over a broad range of flow values and yet permit one to produce the same amount of synthesis gas or to convert the same amount of carbon as feed into a carbon containing gas such as CO.

In the preferred embodiments of this invention, iron is used as the primary source for molten metal. However, any material, that is liquid and has a viscosity about that of molten iron at usual operation conditions of at least about 1000° C. and is capable of readily dissolving carbon, can be used. A critical factor is that the temperature be high enough to break thermally carbon to carbon, halide, or other chemical bonds. Halogens include for example chlorine, fluorine, bromine and iodine.

Other benefits of this process will become clear as the discussion progresses.

Broadly, any oxygen-containing reactant that will convert a particular carbon source to CO is appropriate. An example of an inexpensive oxygen-containing reactant is air or water. The water preferably is in the form of steam.

Synthesis gas for purposes of this specification and claims shall mean any gas composition consisting essential of carbon monoxide and hydrogen. Substantially pure is intended to mean no more than, for example, 5%, and preferably no more than 1%, and still more preferably no more than ½% by weight of any contaminant. The content of the $H_2$ will vary depending upon the amount of water used. Also the purity will be primarily a function of the purity of water and oxidizing gas used. Cryogenic oxygen preferably will have a purity of about 95% and better of pure oxygen based on weight. Throughout the specification, reference is made to "inert" gases. The term "inert" is intended to mean that no significant amount of chemical or physical reaction to either consume, except as a result of heat capacity and temperature or give off heat energy occurs under the operating conditions of temperature, pressure, and composition of materials. For example, an inert gas, such as nitrogen, argon, and the like, is preferably used as a mobilizing gas or motive gas to fluidize and assist transfer of carbon feed, or slag components, or even to cause lift to movement of molten materials between zones of an at least two zone molten bath gasifier of this invention.

DESCRIPTION OF THE PREFERRED EMBODIMENTS

Figure 1:
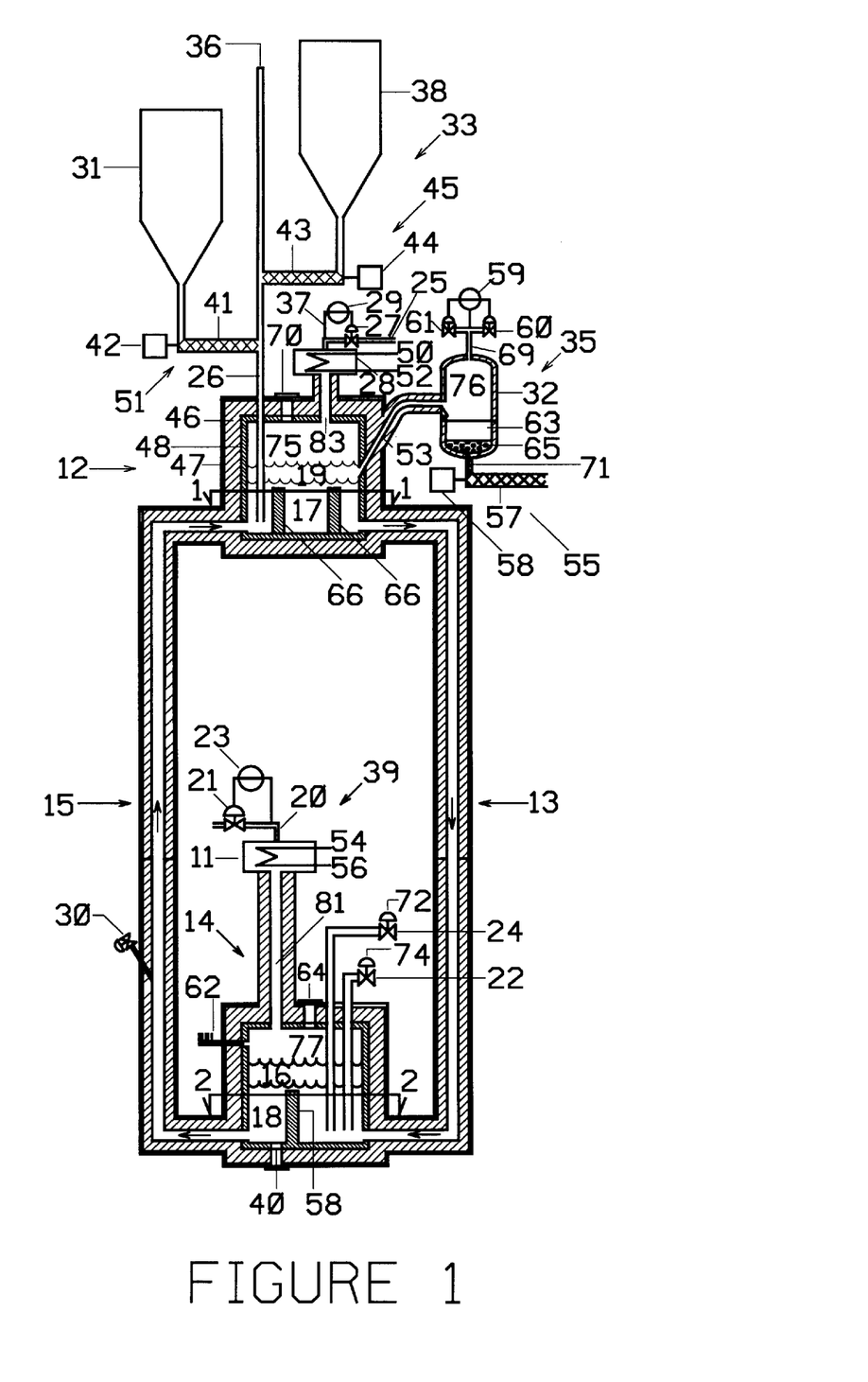
FIG. 1 is an overall schematic cross-sectional side elevation view of a plant or an apparatus that can be used in this invention.

Disclosed in FIG. 1 are a first or upper molten metal bath vessel 12, a second or lower molten metal bath, vessel 14, a conduit 13 for transferring molten metal in layer 17 from vessel 12 to vessel 14, a conduit 15 for transferring molten metal in layer 18 from vessel 14 to vessel 12, a means 33 partially shown schematically for introducing carbonaceous feeds, slag components, and gaseous components, a means 35 for removing slag components in layer 19, a means 37 for controlling the pressure in vessel 12, a means 39 for controlling the pressure in vessel 14 above molten metal layer 18, conduit assembly 22 for introducing a molecular oxygen containing stream, and a conduit assembly 24 for introducing water which may have a variety of forms such as a liquid or a gas, but preferably in the form of steam. The walls of vessels 12 and 14 are disclosed clearly in enlarged FIGS. 2 and 3 to have at least three layers: an outer steel layer or shell 47; an intermediate refractory layer 46 that provides insulating properties; and an inner layer 48 that provides both corrosion resistance and mechanical strength to resist damage as a result of turbulence from molten metal. Vessel 12 has a removable but pressure tight sealable flange plug 70 which provides an opening through which molten metal is introduced on start-up. Vessel 14 has two removable flange plugs 40 and 64. Flange plug 64 provides a means for introducing molten metal during start-up and removable flange plug 40 provides a means for removing molten metal on shut-down. Means 33 for introducing carbonaceous feeds, slag components and gaseous components comprises flux hopper 38, carbonaceous feed hopper 31, one or more conduits 36 though which motive gas under pressure is introduced from a source not shown, screw feed assembly 45 for powders, which in turn comprises a motor 44, and a screw feed 43, screw and feed assembly 51, which in turn comprises a motor 42 and a screw feed 41. Means 37 for controlling pressure in vessel 12 above slag layer 19 comprises heat exchanger 28 with schematic inlet conduit 50 and outlet conduit 52, an exit conduit 25 having a pressure control valve 27 operably connected to a pressure controller 29. Means 35 for removing at least a portion of the slag layer 19 of vessel 12 comprises quench pot 32 shown to contain a quench liquid 63 with solidified particulates 65, means for introducing and removing gaseous components through conduit 69, and a means for removing particulates 65 through conduit 71. Means 39 for controlling pressure in vessel 14 above molten metal bath 18 comprises heat exchanger 11 with inlet conduit 54 and outlet conduit 56, and a pressure regulated conduit 20 in which there is a control valve 21 operably connected to a pressure controller 23.

Broadly, operation of this invention involves three phases: start-up, steady state operation, and shut-down.

Start-Up

A preferred method of start-up of the above described system proceeds as follows:

A burner 62 for supplying heat that is preferably permanently mounted in the top of the second zone is ignited. Burner 62 burns preferably either fuel gas or fuel oil with either air, oxygen enriched air, or even pure oxygen to produce heat. The rate of firing of the burner is adjusted to yield a particular rate of temperature increase in the refractory. Refractory manufactures recommend a certain rate of heat up for a particular refractory material. The recommendation takes into account the fact that if a refractory material is heated up too quickly it is subject to thermal failure, such as spalling. If the refractory has not previously been exposed to high temperature the heating rate may be different from that for refractory which has been previously exposed to high temperatures. The combustion products from the burner will circulate from the second zone of vessel 14 to the first zone of vessel 12 by conduits 13 and 15. The combustion products preferably exit the first zone through conduit 25 with pressure regulator 29 appropriately set at atmospheric pressure. The firing continues until the refractory reaches a temperature in the range of 1200 to 1800° C. and preferably in the range of 1400 to 1500° C. Such heating usually requires at least 20 hours depending upon rate at which refractory can be safely heated so as to avoid damage.

Molten iron with a carbon content of at least 2 wt % and more preferably 4 wt % is introduced into the second zone through a charging port in the top of the second zone at location shown for plug 64. Molten iron with a carbon content in this range is readily available from blast furnaces of steel mills. Such molten iron is often referred to as pig iron. It is frequently transported in special rail cars called "hot metal" cars. Once a sufficient quantity of pig iron is charged to the second zone the charging port is closed and sealed by fill port plug 64, which is preferably bolted in place and sufficiently sealed to maintain whatever pressures are required and to withstand corrosive effects of vapors at high temperature. The temperature of the molten iron in the second zone can be increased from time to time by injecting oxygen through conduit assembly 22 which is pressure regulated by means of valve 74.

The pressure in the second zone is increased by closing the valve 21 in conduit 20 and injecting inert gas and or oxygen through conduit assembly 22. As the pressure increases in the second zone 77, the level of molten iron in conduits 13 and 15 will rise. It is preferred to have sufficient volume in vessel 14 so that enough pig iron can be charged to the second zone to fill conduits 13 and 15 completely and to yield a level of molten iron in the first zone of about 0.5 feet.

After a level of about 0.5 feet of molten iron is established in vessel 12, additional molten iron is added to the first zone through a charging port near the top of the first zone 75. The molten iron temperature in the first and second zones may be adjusted by adding oxygen or steam to the second zone through conduit assemblies 22 or 24, respectively, or oxygen containing gas through conduit 26 into first zone of vessel 12. Fill plug 70 is then bolted and sealed in place sufficiently to maintain whatever pressures are required and to withstand corrosive effects of vapors at high temperature.

To initiate circulation of molten iron from vessel 14 to vessel 12 a small flow of any one or more of the following can be used: a substantially inert gas; synthesis gas; molecular oxygen; air; or steam through downwardly oriented conduit assembly 30 can be added to conduit 15. The flow of carbonaceous feed and flux is preferably initiated shortly after iron circulation begins to maintain a steady state condition.

Shut Down

The system is shut down as follows:

The flow of carbonaceous feed and flux to the first zone is halted. The level in the first zone is adjusted by the pressure control valve 21 in conduit 20 of the second vessel 14 so that most of the slag can be tapped from vessel 12. Then the pressure of the second zone is adjusted so that the level of molten iron in the upper vessel 12 is at its minimum value. Molten iron in the first zone is then tapped. The location of the tap being such that after tapping, the remaining molten iron in the first zone and in conduits 13 and 15 can be stored in the volume of second zone 77.

The pressure in zone 77 is reduced so as to allow all of the remaining molten iron to flow into vessel 14. Once the pressure is reduced to atmospheric pressure a tap having flanged plug 40 in the bottom of vessel 14 is opened and substantially all of the molten iron as a liquid is drained.

If desired, the burner in the top of the second vessel 14 can be used to keep the refractory hot until the next operating period, or the system may be allowed to cool at a predetermined rate adjusted with some heating by burner 62. Alternatively, cooling may be accelerated by adding steam, air or an inert gas to the second zone 77 and or the first zone 75. The cooling rate may be retarded by firing the burner in the top of the second zone 77.

Steady-State Operation

With reference to FIG. 1, the following is a brief discussion of steady-state operation of a preferred embodiment of this invention.

Perhaps the most straight forward way to understand the steady-state operation of the molten metal gasifier of this invention is to consider the relationship of the various energy and material inputs and outputs of the system.

At steady-state operations, with respect to energy balance considerations, the rate at which carbon is dissolved or dispersed in vessel 12, the first zone, results in a net energy consumption due to the endothermic process of dissolving carbon, for example, in iron. This is preferably counter balanced almost exclusively by the net heat generated in vessel 14, the second zone. Vessel 14 permits two types of reactions: one endothermic, e.g. reaction of carbon and water to produce hydrogen and carbon dioxide; and the other, exothermic, e.g. reaction of carbon and molecular oxygen or some other equivalent chemical source to yield preferably one carbon monoxide, but, if desired, some carbon dioxide. The net energy produced clearly depends upon the difference in heat produced by exothermic process versus heat consumed by endothermic processes occurring; hence, for example, the ratio of the amount of water versus molecular oxygen, respectively, used.

With respect to vessel 12, the various inputs comprise: a carbonaceous feed; slag layer components; molten bath components; and a motive gas which can consist of both inert and oxidative components. The outputs from vessel 12 result from pressure regulation and removal of any excess slag layer or excess molten metal and maintaining a substantially constant volume of molten metal. With respect to vessel 14, the inputs comprise: water; an oxidative gas; and recycled molten metal. The outputs from vessel 14 result from pressure regulation and maintaining a substantially constant volume of molten metal within vessel 14.

The following discussion will consider individually each material input or output with respect to vessels 12 and 14.

With respect to vessel 12, means 33 for introducing carbonaceous feeds, slag components, and gaseous components operates in the following way. A solid carbonaceous feed which can comprise chopped up material such as, for example tires, plastics, or any other carbon containing feed, are stored in carbonaceous feed hopper 31. The material preferably is cut into segments roughly one-quarter inch or less. The precise size of the carbonaceous feed is not critical. The feed size is primarily determined by ease of transport through conduits and screw feed assemblies. Carbonaceous feed from feed hopper 31 is transferred into screw feed 41 and transported from screw feed 41 to conduit 26 by means of a screw feed 41 and motor 42. This is a preferred means for introducing carbonaceous feed into conduit 26. It is to be understood that there are other alternative means for introducing carbonaceous feed into vessel 12. An alternative would be to have the conduit 26 enter below the surface of molten metal 17 through a wall. The rate of addition of carbonaceous feed is controlled by the rate motor 42 turns a screw of screw feed 41. A motive gas introduced through conduit 26 indicated by line 36 provides a means for moving carbonaceous feed components through conduit 26 into molten metal bath 17.

To introduce slag layer component corresponding to molten slag layer 19, crushed limestone of roughly ⅛ inch or less are fed from flux hopper 38 into screw feed assembly 45. The particulate size of crushed limestone and other slag components is not in itself critical, except to the extent of providing easy transport through conduits and by means of screw feed 43 and conduit 26. In the drawing, it is illustrated schematically that both the carbonaceous feed and the limestone are introduced together through the same conduit 26. This is a preferred arrangement, but it is not critical to the operation of this invention. It is ideal to have the slag components and the carbonaceous components closely mixed in the molten metal bath layer 17 to increase the likelihood that sulfur, halogens, and other undesirable components will be in intimate contact with slag components to ensure their removal and capture in the slag layer 19. The rate at which slag components are introduced will be controlled by the rate at which they are transferred from flux hopper 38 to screw feed 43, and further controlled by the rate at which the screw of screw feed 43 is turned under the motive force of motor 44.

Since slag layer 19 will eventually become saturated with sulfur components and other undesirable species, the slag layer from time to time or continuously is removed and replaced. The process of removing portions of slag layer 19 is as follows. Pressure within quench pot 32 is regulated by a schematically disclosed split range pressure valve controller 59 arranged to control the inlet pressure as well as the exit pressure from the system. Valve 61 is attached to a source not shown for introducing gas under an appropriate pressure. Similarly, controller 59 controls the outlet valve 60 to relieve pressure from quench pot 32. By adjusting the appropriate inlet and outlet pressures, slag layer 19 can be introduced into quench pot 32. As molten slag layer 19 moves into quench pot 32 through channel 53, it will eventually fall into quench liquid 63, where it solidifies into particulates which form a particulate layer 65 at the bottom of quench pot 32. Particulates 65 are removed by transport through screw feed assembly 55 to a storage area not shown. The quench liquid level is adjusted from time to time by addition through a means not shown. The liquid 63 is preferably water, but other materials which can act as a quench may be used. Examples of such quench liquids are oils, molten salts or metals.

Some of the molten metal layer 17 can be separately removed by first adjusting the level of molten layer 17 to completely cover the opening to pathway 53 which leads to quench pot 32. By adjusting the relative pressures within zone 75 relative to the pressure of zone or region 76 of quench pot 32, molten metal of layer 17 can be transported into quench pot 32.

To regulate pressure of zone 75, the pressure controller 29 controls valve 27 in conduit 25. Since the temperature of gas in zone 75 is so hot, it is necessary to pass hot gases from zone 75 through heat exchanger 28 prior to contacting conduit 25 and valve 27. Heat exchanger 28 has an input 50 for heat exchange material at a temperature in the range of 1000–1300° C., and an output 52 for heat exchange material in the range of about 300° C. to 600° C.

Figure 2:
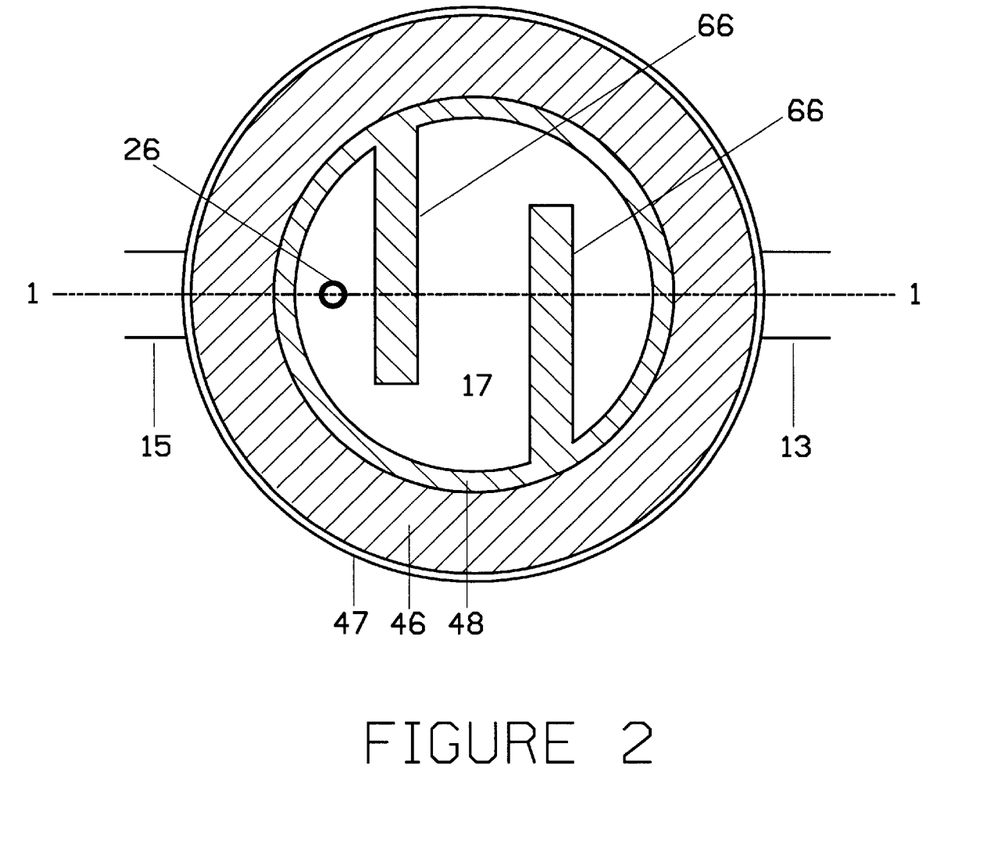
FIG. 2 is an enlarged top elevation view in cross-sectional along line A—A of FIG. 1.
Figure 3:
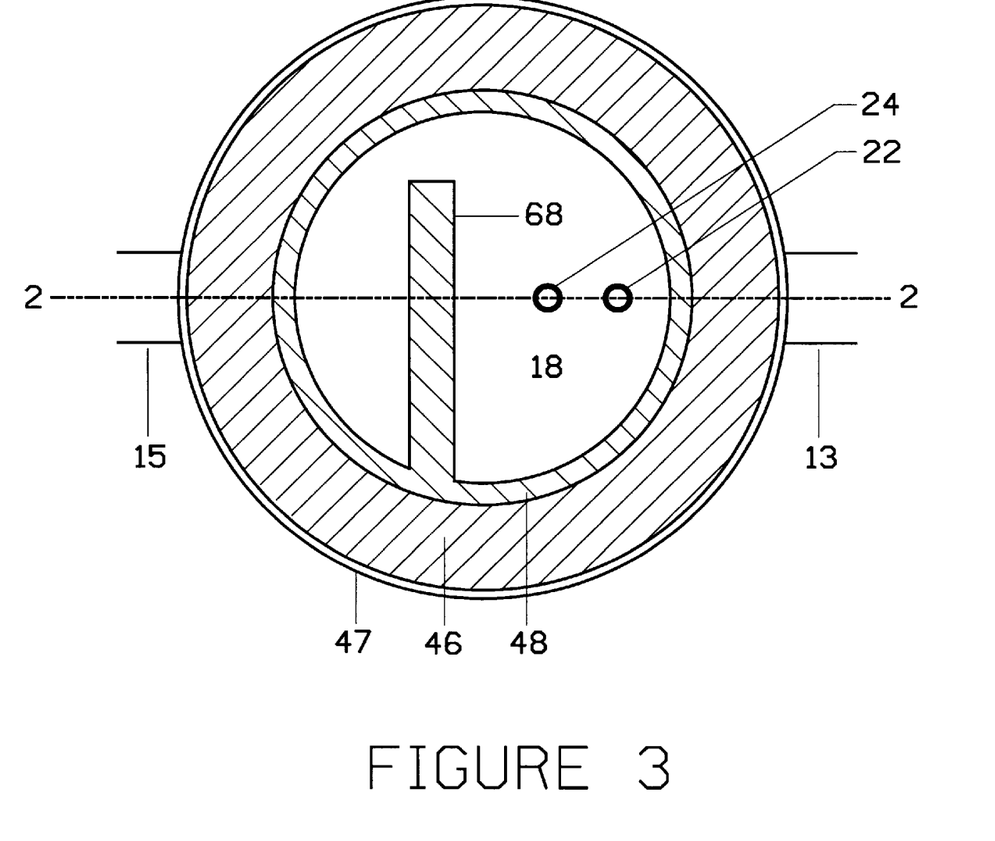
FIG. 3 is an enlarged elevation view in cross-section along line B—B of FIG. 1.
Figure 4:
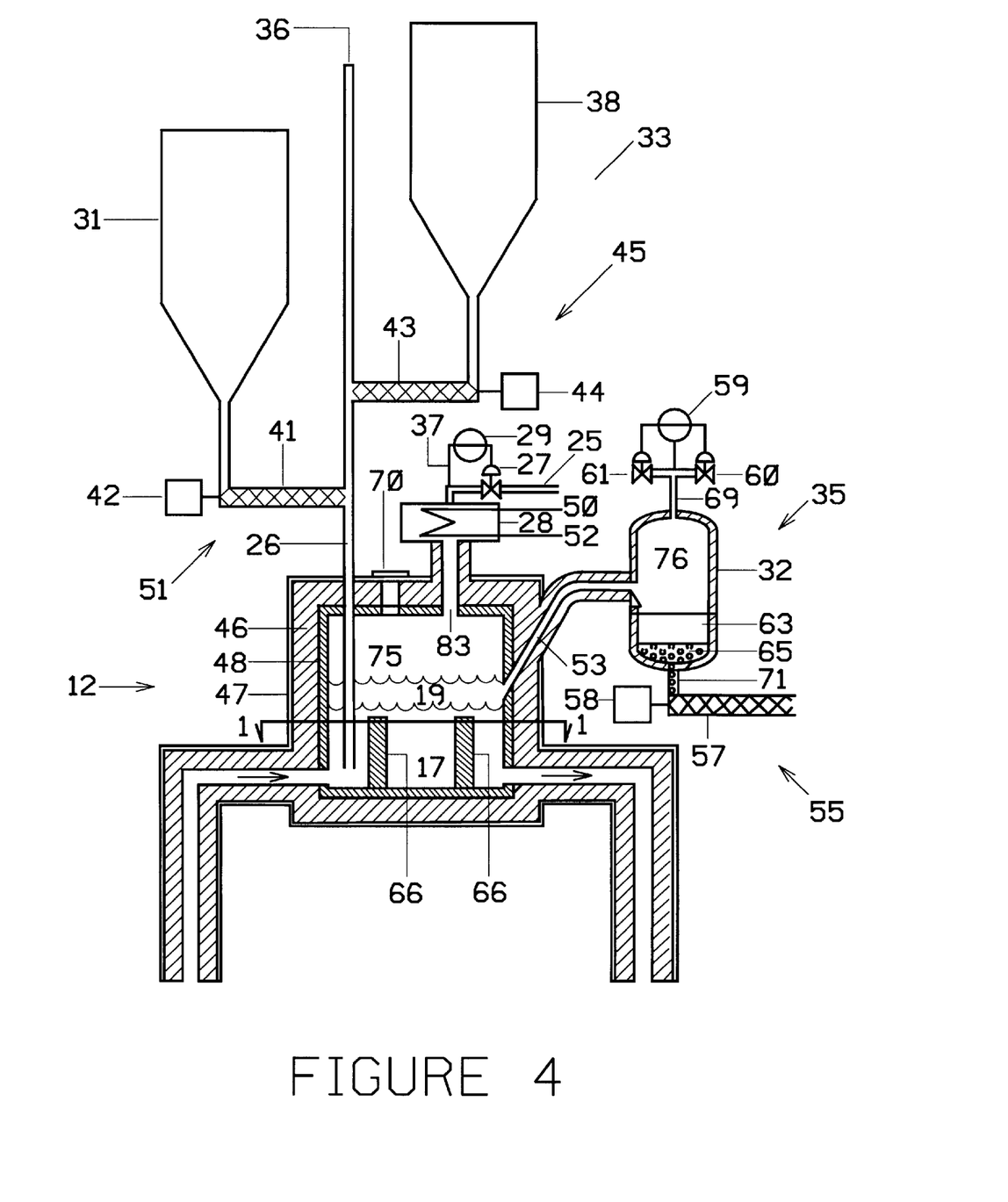
FIG. 4 is an enlarged but modified cross-sectional side elevation view as in FIG. 1 of vessel 12.

Though only one conduit 26 is shown, it is within the intended scope of this invention to have more than one conduit input into the molten layer 17. It is preferred that in all instances, the material introduced into molten layer 17 be introduced below the surface of molten layer 17 to avoid difficulty with slag layer 19 and to ensure the greatest amount of mixing of material into molten layer 17. To further ensure proper mixing weirs 66 are present in vessel 12 to cause a circuitous path of circulating molten metal. To see the circuitous path established by weirs 66, reference is made to enlarged FIG. 2. The numbers in FIG. 2 are the same for corresponding features shown in FIG. 1.

Examples of suitable material for weirs or barriers 66 are: the same or similar ceramic materials as the wall lining.

Examples of suitable heat exchangers corresponding to heat exchangers 28 and 11 are: a tube and shell heat exchanger where the hot gas flows through tubes made of stainless steel, inconel or incalloy being cooled by generating steam on the shell side.

Vessel 12 has walls consisting of preferably three layers. An exterior layer 47 made of structural steel generally in the range of 1–2 inches thick, depending upon the overall pressure that is to be the normal operating pressure of the system. An intermediate layer 46 providing insulation properties to limit the transmission of heat from the interior of vessel 12. Interior layer 48 is an inner refractory material having sufficient corrosion resistance to both slag and molten metal bath components. It is expected that there will be some turbulence as a result of mixing and the introduction of motive gas and feed components through conduit 26 such that some protection for the inner surfaces of vessel 12 different from the insulative properties available to the system by reason of layer 46 will be required.

The operation of vessel 14 is as follows. Air or oxidizing gas is introduced through valve assembly 22 from a source not shown. The oxidizing gas from valve assembly 22 reacts with carbonaceous components within molten layer 18, thereby heating up layer 18. To provide a balance and temperature regulation of molten layer 18, water may be introduced through valve assembly 24 from a source not shown. The water can cause cooling in two ways: one, by endothermic reaction with carbon to form CO and hydrogen; and the other by changing temperature from that on addition to that at steady state conditions. It is possible that a portion of the output coolant from heat exchanger 11 that exits through conduit 56 may to introduced into valve assembly 24. Excess gaseous components from zone 77 are transported to heat exchanger 11 through pathway 81 for indirect heat exchange with coolant introduced through input conduit 54. Examples of coolant in conduit 54 are boiler feeds, saturated steam and the like. Because of the extremely high temperatures in zone 77, it is expected that super heated steam will often be the coolant exiting conduit 56. The gas from zone 77 having been cooled by heat exchanger 11 is then regulated by valve 21 and valve controller 23. Controller 23 regulates the pressure within conduit 20. The gas in conduit 20 consists primarily of a synthesis gas of carbon monoxide and hydrogen. This synthesis gas is taken to a processing zone (not shown) wherein the) components are utilized either as chemical feedstock or as a pollutant free medium BTU fuel gas.

By controller 23, adjusting the pressure of within conduit 20, the pressure in zone 77 can be maintained or changed as desired. By reducing the pressure of zone 77, a net flow of additional molten metal will accumulate in vessel 14. Similarly, by increasing the pressure of zone 77, the layer of molten layer 18 can be moved downward. As the amount of molten metal in vessel 14 decreases, there is a corresponding increase in the volume of molten metal in vessel 12. Consequently by controlling the relative pressures in zones 75 and 77, the relative levels of molten metal in vessels 12 and 14 can be regulated.

Of particular importance in the operation of the system of this invention is the necessity to maintain a flow of molten metal from vessel 12 to vessel 14 and back to vessel 12. Molten metal exits vessel 12 through conduit 13 in the direction shown by the arrows within conduit 13. Similarly, molten metal is transported from vessel 14 back to vessel 12 through conduit 15 in the direction shown by the arrows within conduit 15. To ensure this path of circulation, a motive or lift gas is introduced periodically through input assembly 30 consisting of a valve and conduit. The source for motive or lift gas through input assembly 30 is not shown. The gas may consist of oxygen to increase the temperature of the rising molten metal in conduit 15 or merely an inert gas such as nitrogen to change the overall density of the material in conduit 15 to increase its tendency to rise in conduit 15.

Figure 5:
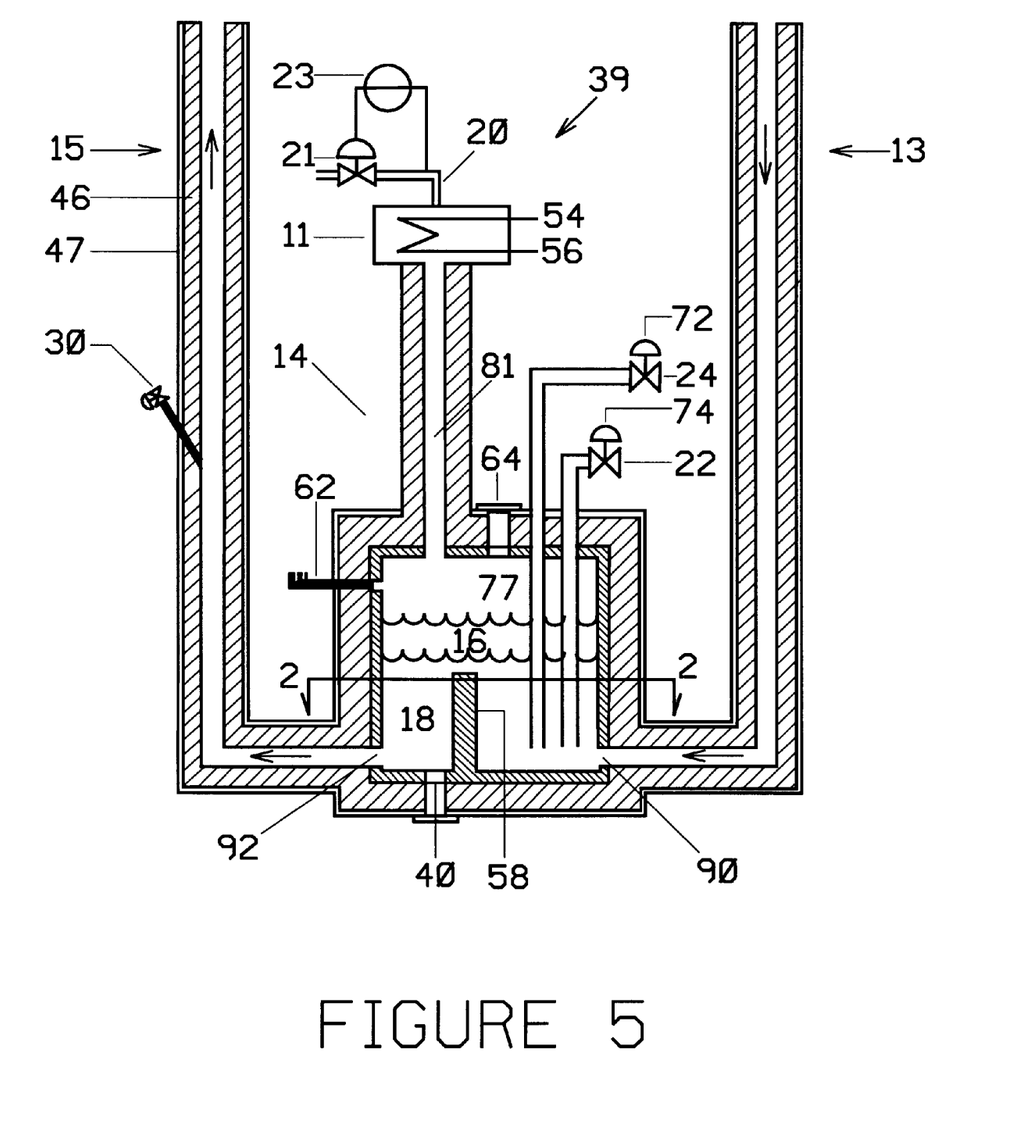
FIG. 5 is an enlarged but modified cross-sectional side elevation view as shown in FIG. 1 of vessel 14.

FIG. 5 shows an enlarged view of vessel 14 and a portion of conduits 13 and 15. It contains a modification to vessel 14, but maintains corresponding numbers the same for corresponding or equivalent features in each. In FIG. 5, a slag layer 16 that is not present in FIG. 1 is shown. To permit removal of slag layer 16 so that there is not an undesirable buildup of that layer in vessel 14, outlet 92 is at a different level relative to inlet 90, thereby permitting by appropriate pressure control to permit removal of all or a portion of layer 16. This is done because although one may not directly add slag components to the second zone, it is possible that these components become entrained within the material transferred from the first zone to the second. In any event, having a slag layer 16 in the second vessel permits a further purification, in the event such is necessary depending upon the carbon feeds, to remove additional undesirable components such as sulfur or halogens and the like from synthesis gas produced in said second zone or vessel 14.

The operation of the embodiment shown in FIG. 5 except for the modification discussed in the immediately preceding paragraph, is substantially the same as that discussed with respect to FIG. 1.

Figure 6:
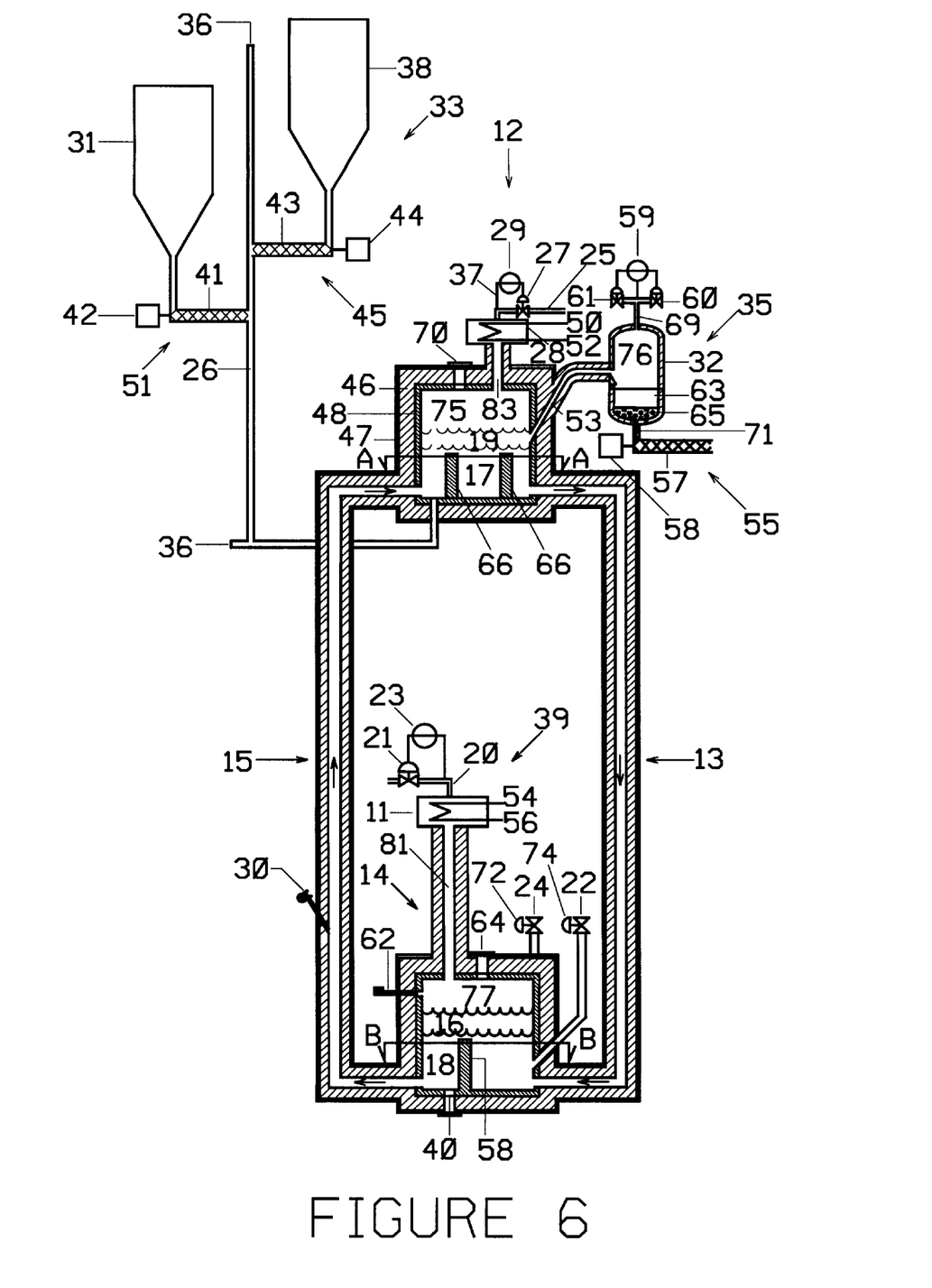
FIG. 6 is an overall schematic cross-sectional side elevation view of a plan or apparatus that can be used in this invention disclosing several modifications over that in FIG. 1.

In FIG. 6, there is a modification to the plant shown in FIG. 1 wherein it is possible to introduce carbon feeds into vessel 12 through a wall below the surface of layer 17. To do this, it is shown that there are two motive gas sources 36 to ensure free movement of any material being transferred through conduit 26. Also it is to be noted that in FIG. 6, a slag layer 16 is shown in the vessel 14. Although inlet 90 is at the same level as 92, it is still possible to remove slag components in the same manner as that disclosed with respect to vessel 12. The vessel 32 and other means are however not shown in FIG. 6.

The following table gives the reactions occurring in the various molten metal layers:

Reactions Occurring in the Slag Layer of the First Zone and Optionally the Second Zone Reactions Occurring in the Molten Metal of First Zone Reactions Occurring in the Molten Metal of Second Zone In FIG. 1, there are: a two zone gasifier 10, a first vessel or zone 12, a second vessel or zone 14, a down flow conduit 13, an upflow conduit 15; a plurality of conduits: a steam and solid conduit 26, an off gas conduit 25, a steam or liquid conduit assembly 24 for the second zone 14, oxygen containing stream inlet conduit assembly 22 and a syngas outlet conduit 20, and, optionally, a secondary gas inlet conduit assembly 30, molten metal or slag tap pathway 53 and quench pot 32.

With reference to FIG. 1, in first zone 12, there are two immiscible liquid layers. The lower level consists of a molten metal layer 17. Preferably, the molten layer will consist of iron because of its very high solubility for carbon, low volatility or vapor pressure at optimal operating temperatures, and a viscosity in the range of about 2 to 20 centipoise ("cps") at operating temperatures in the range of 1147° C. to 1800° C. However, other materials which have suitably high solubility of carbon, e.g. in excess of ½ wt %, could be used. An ideal material would be molten at a much lower temperature with a very high level of solubility for carbonaceous material, but also with a suitably low viscosity and low volatility or vapor pressure at operating conditions. For example, a viscosity in the range of about 2 to 100 cps and a vapor pressure less than about 1 torr (one millimeter of mercury) and preferably less than about 0.1 torr for molten material at a temperature in the range of about 1000 to 1800° C. The second level 19, less dense than molten metal layer 17, is a slag layer 19. In zone 12 the temperature of the molten metal layer in the case of iron is 1300° C. but can be anywhere in a temperature range of 1147° C. to 1800° C. The pressure in first zone 12 can be anywhere in the range of about 0 psig to 15 psig, and preferably is in the range of about 5 psig to 10 psig. The temperatures and pressures are preferably dictated by thermodynamic considerations to optimize any reactions occurring and to optimize the propensity of any undesirable materials such as sulfur or halides to be captured by slag layer 19.

As is clear from FIG. 1, from time to time or on a continuous basis it is desirable to remove slag or iron through passageway 53. This will be true because slag from time to time or continuously will be added in the form of slag precursor materials, such as calcium oxide and perhaps silicates. Iron is often present in carbon source materials such as coal; consequently, some iron from time to time will also have to be removed to maintain proper molten phase levels.

Transport gas and solids such as carbon-containing materials are introduced through conduit 26 which optionally may also involve additional conduits. Off gases that are produced in first zone 12 or introduced into the first zone as a result of reactions occurring in the second zone 14 or as a result of introducing gas through conduit assembly 30 and are vented through off gas conduit 25 after transport through pathway 83 and heat exchanger 28 wherein there is an indirect heat exchange to reduce its temperature.

The second zone 14 contains a molten layer 18 and as, shown in FIG. 2 may optionally contain a slag layer 19 the temperature of the second zone is 1147° C. to 1800° C., the pressure is preferably 25 psig to 3000 psig. These temperatures are dictated by heat requirements in the first zone and heat losses elsewhere through out the system. Higher pressures and temperatures are possible and only limited by the practical cost of operation and materials available.

Down flow conduit 13 interconnects first zone 12 with second zone 14. Up flow conduit 15 also interconnects first zone 12 to second zone 14. Due to the temperature difference between the first zone and the second zone convective transfer of molten metal will occur from the first zone to the second zone and back. Initially, molten iron or other molten material in zone 12 will be transferred through down flow conduit 13 to the second zone 14. Since an oxygen containing stream is introduced into the second zone, the temperature of the second zone will be hotter than that of the first zone, and, therefore, there will be a tendency for the heated molten metal of layer 18 to be transferred through conduit 15 back to the first zone. Optionally, as a method for increasing the rate of circulation and to improve the flow rate and sometimes even to initiate the direction of flow, gas either inert or oxidizing can be introduced through conduit assembly 30. With the introduction of gas through conduit assembly 30, the tendency for the molten metal to move up through conduit 15 and down through conduit 13 is increased.

As a method for controlling the amount of temperature in the second zone, optionally, steam or other liquid can be introduced through conduit 24. Steam introduced through conduit 24 will provide temperature control through an endothermic reaction with any carbonaceous material present, wherein water plus carbon become hydrogen and carbon monoxide. The pressure in force per unit area in the second zone of vessel 14 will depend upon the relative heights of molten material in each of the zones and the difference in heights between each zone, taking into account any variation, uniform or not, in densities of relevant portions of molten material. For example, the densities of layers 16 and 18 in appropriate units times their respective heights are deducted from pressure or force per unit area produced by the molten material in each conduit 13 and 15 plus molten layers 17 and 19, i.e. respective heights times their respective densities in appropriate units. The pressure of gas in second vessel 14 will be determined by the amount of back pressure maintained within synthesis gas conduit 20 by the control valve 21. The pressure in the first zone will be determined by the off gas pressure determined by the valve 27 on off gas conduit 25. To some degree, the amount of back pressure from slag taps and iron taps also play a part. However, it is preferred that the primary control of the relative molten liquid layers and their heights within the first and second zones shall be determined by the back pressure determined by any gases above these liquids.

Reactions occurring in the first zone of vessel 12 are: the reactions occurring in the molten slag layer 16; and the reactions in molten metal layer 17. The reactions occurring in the second zone of vessel 14 are: the reactions in the molten metal layer 18 and optionally, in the presence of a slag layer such as shown in FIG. 5.

The off gas with a total pressure in the range of 0 to 15 psig through conduit 25 will have a composition expressed as volume per cent in the range of about 20 to 80% $H_2$, 15 to 70% CO, 0.5 to 5% $N_2$ and minor amounts of various other gases, all of the foregoing depending on the carbonaceous feed source and any mobilizing or fluidizing gas added to zone one, directly or indirectly.

The synthesis gas exiting through the synthesis gas conduit 20 will have a composition expressed as volume per cent in the range of 10 to 40% $H_2$, 55 to 85% CO, 0.5 to 5% $N_2$, 2 to 10% Ar and minor amounts of various other gases depending on the source of oxygen with a pressure in the range of 25 to 3000 psi.

The circulation rate from first zone to second zone will be in the range of 25 to 1000 lb iron per net lb of carbon dissolved in the first zone. Consequently, the greater rate of carbon introduced into the first zone, the greater will be the circulation rate at steady-state conditions all other factors being held constant.

The slag composition by weight of slag layer 19 in the first zone has ranges from 13 to 55% CaO, 20 to 43% $SiO_2$, 12 to 24% $Al_2O_3$, 1 to 25% CaS, 0 to 5% MgO, 0 to 5% $TiO_2$, 0 to 2% $K_2O$ and 0 to 2% $Na_2O$. The presence and quantity of constituents in the slag layer is dependent on the type and quantity of carbonaceous material fed to the first zone and the rate and composition of flux addition to the first zone. It is possible that other species would be found in the slag layer than mentioned above such as halides and heavy metals.

The advantage of having a slag layer 19 in the first zone is that sulfur, chlorine or other halides which are contained in the carbonaceous feed or are contained in other streams feeding into either the first or second zones react with calcium oxide (CaO) and or magnesium, oxide (MgO) in the slag layer to form the corresponding sulfides or halides. These sulfides and halides exit the first zone when slag is tapped from the first zone. Sulfides and halides in this form are non hazardous and rather easily handled.

An example of this invention is a gasifier having two zones each with the following capacities: the first zone consists of a cylindrical, refractory lined, steel shell vessel having an internal diameter of at least three (3) feet but more preferably ten (10) to fifteen (15) feet although larger diameters are feasible if very large carbonaceous feed rates are required. The depth of molten iron in this vessel is preferably at least two (2) feet but more preferably three (3) to eight (8) feet although greater depths are possible and may be required if the particular carbonaceous feed being introduced is slow to dissolve in the molten metal layer. The depth of liquid slag floating upon the molten metal is preferably at least one (1) inch thick but more preferably six (6) to eighteen (18) inches thick, although greater depths are possible.

The particular refractory lining of all areas that are in contact with molten metal or iron, slag and reducing gases at temperatures above 1100° C. is of critical importance. In the first zone the areas exposed to and adjacent to slag and molten iron are the most susceptible to attack. Multiple layers of ceramic materials offer the best performance as is the case in similar environments in the steel making industry. The inner most refractory material in areas in contact with molten slag or molten iron should be a fused-cast alpha alumina such as Monofrax A-2 of the Carborundum Company. High alumina brick such as Korundal XD of Harbison-Walker Refractories also perform well in this service. In areas of less severe services high alumina castable material such as Harmix CU or Harmix AL also by Harbison-Walker Refractories may be used as the inner surface. Behind the first layer of ceramic described above various insulating firebrick or castable materials may be used. If castable materials are used they may or may not be reinforced with fibers made of stainless steel or other suitable materials.

The temperature of the molten iron or metal in this zone must be at least above its melting point. The melting point of iron (1535° C. at 0% carbon) decreases with increasing carbon content up to 4.2 wt % carbon where the melting point is 1147° C., as the carbon content continues to increase above 4.2wt % the melting point increases rapidly to in excess of 1600° C. at 6.7 wt % carbon. It is anticipated that at normal operating conditions the carbon content of the molten iron in the first zone will be at least 3 wt % and as high as 4.5 wt % but more preferably around 3.3 to 4.2 wt %. This requires a minimum temperature of between 1147° C. and 1800° C. A safety margin of approximately 50° C. should be added to the minimum since the temperature through out the zone will not be completely uniform.

The pressure in the first zone is preferably equal to or a little above atmospheric pressure to eliminate the need for expensive vacuum producing equipment and more preferably in the range of 5 to 10 psig to allow for pressure drop in downstream processing equipment without requiring negative pressure at some point in the process. The pressure may be greater than 10 psig but this can cause introducing solids into the molten iron to be more difficult, but if much lower than 5 psig operation also becomes more difficult.

Carbonaceous solids are added through hopper 31. This hopper may have a long vertical drop pipe to a screw feeder (or similar device). The coal in the vertical drop pipe may be fluidized by any of several gases such as nitrogen or flue gas to produce a pressure head sufficient to overcome the pressure of the first zone, the pressure of the molten iron and slag above the outlet of conduit 26, and the pressure drop due to friction in conduit 26. Alternately hopper 31 may be pressurized to a pressure sufficient to overcome the above mentioned pressures required to feed the carbonaceous material into the first zone. If hopper 31 is pressurized two identical hoppers will be required so that one can be in operation while the other is being refilled with carbonaceous solids. Another option would be to use a screw feeder which seals sufficiently to allow it to overcome the pressure required to feed the solids into the first zone. Such self sealing screw feeders have been demonstrated on a experimental scale and may become commercially available soon.

A second hopper, 38, is used to feed flux material, typically calcium carbonate, into the first zone that is in every other way generally identical to hopper 31. Both hopper 38 and 31 may discharge into a common conduit, 26, as shown in FIG. 1 or separate conduits may be used. Alternatively the flux material may be mixed with carbonaceous feed thereby eliminating one of the hoppers but making independent control of flux to carbonaceous feed ratio more difficult.

By any of the means mentioned above the carbonaceous feed and flux preferably are pneumatically transported in conduit 26 by a suitable high velocity gas such as a mixture of carbon monoxide and hydrogen produced in the second zone as described below at sufficient pressure and velocity so as to inject the solids at a depth of at least two (2) feet and preferably about three (3) to six(6) feet below the average level of molten iron layer 17. Injection may be at depths of greater than six (6) feet however there is no incentive to do so unless the carbonaceous feed fails to completely dissolve in the molten iron at lesser depths. The end of the lance must be at least one (1) and preferably two (2) feet above the ceramic lining of the floor of the second zone (the same is true for the first zone) to prevent excessive impingement and abrasion of the ceramic liner.

Hydrogen contained in the solids fed beneath the molten iron or metal layer react in near stoichiometric quantities to form hydrogen gas which bubbles rapidly to the surface and exits through conduit 25. Oxygen contained in these solids combines almost exclusively with carbon dissolved in the molten iron to form carbon monoxide. Sulfur contained in the solids reacts initially with iron to form FeS. The FeS later reacts with CaO and carbon to form CaS and CO. Nitrogen contained in these solids may initially react with molten iron to form iron nitrides. However once an equilibrium level of iron nitrides is reached additional nitrogen will react to form gaseous nitrogen which bubbles to the surface and exits through conduit 25. Halides in the feed solids will eventually react with the slag to form the corresponding calcium halide. Any iron in the feed solids whether free iron or chemically bound will react to form elemental iron and increase the quantity of molten iron in the system.

As the solids are continually fed to the first zone gas will be continuously produced with a typical composition of discussed hereinbefore. This gas exits the first zone at a temperature of at least 1100° C. At this temperature the gas must be conveyed in a refractory lined conduit 83 since commonly available metals can not withstand such conditions. The hot gas is heat exchanged in a boiler system similar to that of the convection section of a fired process heater in a petroleum refinery. After reducing the temperature to less than 300° C. conventional alloy steel piping and valves can be employed to convey and control the gas. This gas could be compressed for further processing to yield refinery or chemical grade hydrogen or to produce chemical feedstocks for processes that produce methanol or formaldehyde or polymers found in Fischer-Tropsch reactors.

By adjusting the level of molten iron and slag in the first zone by means of the differential pressure between the first zone and the second zone, it is possible to withdraw slag or molten metal, e.g. iron, separately from the same tap provided only slag or only molten iron enter tap pathway 53 separately. However, if large quantities of either must be withdrawn it is preferable to have a separate tap for each component.

Measurement and indication of slag and molten iron levels in both the first zone and the second zone are critical to the successful operation of this process. A preferred method for measurement of molten iron and molten slag levels is a nuclear level detector. This method has the particular advantage that all of the components of the level detector can reside outside of the vessel in which the level is being measured. A particular example of such a level detector is the SHLG-1 manufactured by the Ohmart Corporation. This detector uses a Cesium 137 radioactive source with a strength of at least 2000 m Ci. Depending on the size and design of the particular vessel other types of nuclear level detectors can be used.

Most of the reactions occurring in the first zone are endothermic or require heat. This heat is supplied by molten iron at a temperature 100 to 300° C. hotter than the first zone flowing from the second zone to the first zone through conduit 15. Cooler, carbon rich molten iron flows by gravity from the first zone to the second zone through conduit 13. The method by which this flow is initiated and maintained is discussed elsewhere in this specification.

The second zone consists of a cylindrical,refractory lined, steel shell vessel, having an internal diameter of at least three (3) feet but more preferably ten (10) to fifteen (15) feet. Larger diameters are feasible if very large feed rates are required. The depth of molten iron in this vessel is at least 1 foot but more preferably two (2) to eight (8). A layer of molten slag may or may not be present. Considerations in selection the refractory lining for the second zone are similar to those discussed earlier for the first zone.

The gas pressure in the second zone is the sum of the gas pressure in the first zone, the vertical height of molten iron as measured from the molten iron interface in the second zone to the molten iron interface in the first zone multiplied by the density of the molten iron expressed in appropriate units and the depth of slag in the second zone (if any) subtracted from the depth of slag expressed in appropriate units. The pressure in the second zone increases by approximately 3 psig for each vertical foot of increase in the difference between the molten iron layer in the first zone and the molten iron layer in the second zone all other parameters held constant. The pressure for this example where the vertical separation between the two zones is approximately 100 feet is 300 psig. The minimum pressure for the second zone is roughly 25 psig since the distance 8 feet to ensure reasonable rates of circulation and quantities.

There is no absolute maximum pressure for the second zone. However, as the vertical distance of the molten metal layer 17 including slag layer 19 in the first zone of vessel 14 above the second zone increases beyond 100 feet, design, construction problems, and costs increase rapidly. The economic benefit of having the synthesis gas exiting the second zone of vessel 14 at a pressure above 300 psig increases only slightly.

In the second zone of vessel 14, carbon dissolved in the molten metal bath 18 is contacted with a source for oxygen (or oxygen produced by any other method which result in steam). To keep the system in carbon balance the consumption of carbon to form carbon monoxide by oxygen and steam in the second zone must match the amount of carbon which is fed into the first zone minus the amount of carbon leaving the first zone as gas through conduit 25. The reaction of oxygen with carbon to form carbon monoxide is exothermic. The reaction of steam ($H_2O$) with carbon to form hydrogen and carbon monoxide is endothermic. Temperature control of the iron in the second zone is preferably controlled by adjusting the ratio of steam to molecular oxygen contacting the molten iron in the second zone. The conduits for steam and oxygen preferably introduce these below the surface of molten metal in the second zone by about two (2) to ten (10) inches and more preferably about six (6) inches although it is possible to operate with the conduits submerge to lesser or greater depths. However, poorer oxygen and steam utilization occur when the conduits are submerge at depths of less than about two (2) inches and no significant benefit is derived from depths of greater than about ten (10) inches. The conduits which are often referred to as lances must be of special design and construction to withstand the extreme temperature and chemically active environment found in this service. Water, oil, or other cooling media circulating within is usually employed with these lances to prevent them from reaching damaging temperatures.

Circulation of molten iron from the hotter second zone to the cooler first zone and back is primarily the result of a difference in density between the molten iron in the upflow conduit 15, and that density in the molten iron in the downflow conduit 13. The density of molten iron in this system is primarily a function of two parameters; namely, carbon content and temperature of the molten iron. Within the range of operating conditions for this system the density of molten iron decreases with increasing carbon content and with increasing temperature. An increasing difference in density between the molten iron in conduits 13 and 15 result in a pressure differential which causes flow. As the flow rate of molten iron in conduits 13 and 15 increases the pressure loss due to flow increases. Thus a given density difference between the molten iron in conduits 13 and 15 will produce a particular flow rate of molten iron assuming that all other parameters are constant.

An example of circulation is given as follows:

1. The internal diameter of both conduit 13 and 15 is 12 inches. The equivalent flow length of each of these conduits is 150 feet while the vertical distance from the bottom of the inlets to the bottom of the outlets of each conduit is 100 feet.

2. The rate of carbon dissolving in the first zone is 15224 lbs/hr. The temperature of the first zone is 1300° C., the temperature of the second zone is 1600° C. The carbon content of the first zone is 4.0% while the carbon content of the second zone is 3.68%. This results in a density of 436.8 lb/cuft (pounds per cubic foot) and a viscosity of 9 centipoise for the first zone and a density of 422.2 lb/cuft and a viscosity of 6 centipoise for the second zone. For the densities and vertical separation stated above, the pressure differential that result to produce flow is approximately 10.0 psi.

3. To dissolve 15224 lbs/hr of carbon in the first zone when the inlet carbon concentration in the molten iron is 3.68 wt% and the outlet carbon concentration in the molten iron is 4.00 wt %, an iron circulation rate of 4,776,000 lb/hr is require.

4. The pressure drop in conduit 15 due, to friction of flow is approximately 3.1 psi while the pressure drop in conduit 13 due to friction of flow is approximately 3.2 psi. This shows that more pressure differential is available for flow than is required by the two conduits. The temperature in the second zone could be reduced or the temperature in the first zone increased to yield the desired flow rate or the system operated at a slightly higher iron circulation rate without changing the temperature of either zone.

An example of typical operation is given as follows:

1. Fifteen (15) tons per hour of coal having the following composition are fed to the first zone:

| | |
|---|---|
| Carbon | 71.1 wt % |
| Hydrogen | 4.8 |
| Oxygen | 6.6 |
| Nitrogen | 1.2 |
| Sulfur | 3.9 |
| Moisture | 2.0 |
| Ash | 10.4 |

2. At this feed rate the following limestone addition rate is required to remove the sulfur contained in the incoming coal without exceeding a CaS level of 20%:

| | mol wt. | mol/hr | mol % | lb/hr | wt % |
|---|---|---|---|---|---|
| CaCO3 | 100.09 | 97.52 | 77.4% | 9761.0 | 95% |
| Moisture | 18.02 | 28.52 | 22.6% | 513.7 | 5% |
| Total | | 126.04 | 100.0% | 10274.8 | 100% |

3. With these addition rates, the following gas flow and composition excluding the flow and composition of gas that is used to pneumatically transport the solids in conduit 26 is produced and exits from conduit 25:

| Gas Leaving Vessel | | | | | |
|---|---|---|---|---|---|
| | mol wt. | mol/hr | mol % | lb/hr | wt % |
| H2 | 2.02 | 776.2 | 66.4% | 1564.6 | 12.4% |
| CO | 28.01 | 380.6 | 32.5% | 10661.4 | 84.7% |
| N2 | 28.01 | 12.9 | 1.1% | 360.0 | 2.9% |
| Total | | 1169.7 | 100.0% | 12586.1 | 100.0% |

4. Consistent with a material balance, the additional amount of carbon leaving the first zone over that coming into the first zone from the second zone is:

15244.4 lbs/hr or 1269.2 mol/hr

5. The-quantity and composition of slag leaving the first zone is as follows:

| Species Leaving Vessel in Slag | | | | | |
|---|---|---|---|---|---|
| | mol wt. | mol/hr | mol % | lb/hr | wt % |
| CaS | 72.14 | 36.49 | 18.3% | 2632.7 | 20.0% |
| CaO | 56.079 | 61.03 | 30.6% | 3422.5 | 26.0% |
| SiO2 | 60.084 | 78.87 | 39.5% | 4738.8 | 36.0% |
| Al2O3 | 101.96 | 23.24 | 11.6% | 2369.4 | 18.0% |
| Total | | 199.63 | 100.0% | 13163.4 | 100.0% |

6. The quantity and composition of cryogenic oxygen and the quantity of steam added to the second zone are as follows:

| Oxygen Fed to Lower Vessel | | | | |
|---|---|---|---|---|
| | mol wt. | mol % | mol/hr | lb/hr |
| Argon | 39.95 | 1.69% | 7.7 | 306.0 |
| Oxygen | 32.00 | 98.00% | 444.2 | 14214.0 |
| Nitrogen | 28.01 | 0.31% | 1.4 | 38.6 |
| Total | | 100.00% | 453.2 | 14558.6 |

| Steam Fed to Lower Vessel | |
|---|---|
| mol/hr | lb/hr |
| 380.8 | 6860.1 |

7. The quantity and composition of gas leaving the second zone is as follows:

| Gas Leaving Lower Vessel | | | | | |
|---|---|---|---|---|---|
| | mol wt. | mol/hr | mol % | lb/hr | wt % |
| H2 | 2.02 | 380.8 | 23.0% | 767.5 | 2.1% |
| CO | 28.01 | 1269.2 | 76.5% | 35551.0 | 97.0% |
| N2 | 28.01 | 1.4 | 0.1% | 39.4 | 0.1% |
| Ar | 39.948 | 7.7 | 0.5% | 306.0 | 0.8% |
| Total | | 1659.0 | 100.0% | 36663.9 | 100.0% |

A variation of this invention consists in installing a cooling jacket between the refractory and the steel wall of all or part of the system. The cooling rate could be adjusted so that a layer of solidified slag or iron would form on the inside wall of the refractory to prevent or reduced attack by slag or molten iron. Such an arrangement can be particularly useful in areas where molten slag contacts refractory.

A second variation of this invention consists in using it in conjunction with a coal carbonization process. Coal carbonization destructively distills volatile hydrocarbons from coal leaving a nonvolatile residue of coke which is sometimes referred to as char. Char is primarily carbon and ash. The char is a carbonaceous feed readily soluble in the molten iron bath of the first zone.

A third variation of this invention is to use automobile tires as the carbonaceous feed to the first zone. The tires are preferably reduced in size to ¼ inches or less and injected as with coal. This process would be particularly well suited to handle automobile tires since the steel in the cord and sidewalls would be readily converted into molten iron.

A fourth variation of this invention is to use hazardous organic chemicals such as dioxin, polychlorinated biphenyls, nitriles, polyhalogenated organic compounds, and the like as all or part of the carbonaceous feed. These materials could either be injected beneath the surface of molten metal in zone 1 or injected into the upflow conduit 13, if longer residence time at elevated temperature is desired. At temperatures above 1200° C. all hazardous organic compounds rapidly and completely decompose, i.e. chemical bonds such as c—c bonds thermally break. Sulfur, Chlorine and Fluorine are captured by the slag. Heavy meals such as chromium, cadmium, mercury, lead, or arsenic either form an alloy with the molten iron or are captured by the slag.

A fifth variation of this invention is to use spent limestone from limestone scrubbers as all or part of the source of the slag components, e.g. the calcium fed, to the first zone. Spent limestone from limestone scrubbers seldom contains more than 10% sulfur and at least 80 per cent of the calcium present is either calcium oxide or calcium carbonate.

A sixth variation of this invention is to add baffles made of refractory similar or identical to the lining of zones one and two to cause more desirable flow patterns in either the first or second zone.

A seventh variation of this invention is to use an electromagnetic pump for either primary movement of the molten iron or as a means of controlling the flowrate of molten iron. These types of pumps were developed for circulating liquid metal coolant in breeder reactors in the nuclear power industry. A pump of this capable of producing a sufficient differential pressure can be used in this application so that the first zone and second zones are or can be at the same or nearly the same elevations. The electromagnetic pump would allow the second zone to operate at whatever pressure is required to produce synthesis gas for down steam processing. Electromagnetic pumps can also be used to retard flow by generating electricity.

An eighth variation of this invention is regenerating the slag tapped from the first zone, preferably while still hot to avoid the requirement of reheating, with steam and perhaps oxygen to convert calcium sulfide in the slag to elemental sulfur, hydrogen sulfide, sulfur dioxide, or calcium oxide. Part of the slag regenerated in this fashion is preferably returned to the flux hopper 34 to reduce the amount of limestone added. Some of the slag whether regenerated or not is preferably not recycled to avoid any possible accumulation in the slag of unwanted species, such as sulfur, halogen, heavy metals and the like.

Specific compositions, methods, or embodiments discussed are intended to be only illustrative of the invention disclosed by this specification. Variations in addition to those already disclosed on the compositions, methods, or embodiments are readily apparent to a person of skill in the art based upon the teachings of this specification and are therefore intended to be included as part of the inventions disclosed herein.

Any reference identified in this specification is intended to result in such reference being expressly incorporated herein by reference including any patents or other literature references cited within such references.

What is claimed is:

1. An apparatus for conversion of a carbon source to a gas comprising hydrogen, and carbon monoxide, at a pressure in the range of 25 psig to 3000 psig, said plant comprising:
   (a) a first zone means for containing molten metal at a desired temperature comprising:
      (1) a first zone gas outlet means for removing gaseous components;
      (2) a first zone liquid outlet means for removing at least a portion of a slag layer;
      (3) a first zone input means for introducing to said first zone means carbon feeds;
      (4) a first zone recycle outlet means for connecting said first zone means to a first recycle conduit;
      (5) a first zone recycle inlet means for connecting said first zone means to a second recycle conduit;
      (6) a first zone pressure regulating means for controlling pressure of any gases therein;
   (b) a second zone means for containing molten metal at a desired temperature comprising:
      (1) a second zone recycle inlet means for connecting said second zone means to a second recycle conduit;
      (2) a second zone recycle outlet means for connecting said second zone means to a second recycle conduit;
      (3) an inlet means for introducing oxygen;
      (4) an inlet means for introducing water;
      (5) a second zone gas outlet means for removing gaseous components;
   (c) said first recycle conduit for molten metal having an inlet and an outlet;
   (d) a second recycle conduit for molten metal having an inlet an outlet and a downwardly oriented gas injection means for introducing a gas under pressure through a wall of said second recycle conduit;
   (e) a second zone pressure regulating means for controlling pressure of any gases therein; and
   wherein said first zone gas outlet means and said second zone gas outlet means are each connected, respectively, in a fluid tight fashion to said first zone pressure regulating means and said second zone pressure regulating means for controlling pressure therewithin; said first zone input means is connected to a means for transferring solids or gases in a fluid tight fashion with means for controlling pressure of such transfer into said first zone means; said first recycle conduit is connected in a fluid tight seal to said first zone recycle outlet; said outlet of said first recycle conduit is connected to form a fluid tight seal to said second zone recycle inlet; said inlet of said second recycle conduit is connected to form a fluid tight seal to said second outlet; said outlet of said second recycle conduit is connected to form a fluid tight connection to said first zone recycle inlet; whereby both gravity flow and an injection of gas through said downwardly oriented gas injection means transfer hot metal from said zone to said second zone and back; and wherein said second zone pressure regulating means attached to said second zone gas outlets means controls pressure in said second zone means so as to provide a means for controlling the level of molten metal within said second zone means relative to the amount of molten metal in said first zone means and for removing off-gases at a controlled pressure.

2. The plant of claim 1, wherein there is a means for heating interior walls of said first and second zones and interior walls of said first and second recycle conduits.

3. The plant of claim 1, wherein said second zone pressure regulating means connected to said second zone gas outlet means comprises a heat exchanger to cool gases that are being pressure regulated.

4. The plant of claim 1, wherein said second zone recycle inlet is at a different vertical height from that for said second zone recycle outlets.

5. The plant of claim 4, wherein said second zone recycle inlet is lower in vertical height than that for said second zone recycle outlets.

6. A plant for conversion of a carbon feed to a gas comprising hydrogen and carbon monoxide, said plant comprising:
   a. a first zone means suitable to contain a molten material that is at a temperature of at least 1000° C. at a pressure in the range of 0 to 15 psig comprising:

a first zone liquid outlet means for removing at least a portion of a slag layer from said first zone means;

a first zone input means for introducing into said carbon feed;

a first zone pressure regulating means for controlling pressure of any gases therein;

a first zone recycle outlet for permitting transfer of said molten material as a liquid at 1000° C. or more from said first zone to a second zone and a first zone recycle inlet for permitting transfer of said molten material from said second zone into said first zone; and b. said second zone means suitable to contain said molten material at a pressure in the range of about 25 to 3000 psig comprising:

a second zone recycle inlet means for permitting transfer of material from said first zone means to said second zone means;

a second zone recycle outlet means for permitting transfer of material from said second zone to said first zone; and an oxygen-containing source inlet means for permitting introduction of an oxygen-containing materials into said second zone under a controlled pressure and at a controlled rate;

a second zone pressure regulating means for permitting transfer of gases from said second zone under a controlled pressure and at a controlled rate;

c. a first recycle conduit means for transferring molten metal wherein said means has at least one inlet and at least one outlet; and d. a second recycle conduit means for transferring molten metal, wherein said means has at least one inlet and at least one outlet;

wherein said first zone gas outlet means is connected in a fluid tight fashion to said first zone pressure regulating means for controlling pressure within said first zone; said first zone input means is connected to a means for transferring solids or gases in a fluid tight seal fashion with means for controlling pressure of such transfer into said first zone; said at least one inlet of said first recycle conduit means is connected in a fluid tight seal to said first zone recycle outlet; said at least one outlet of said first recycle conduit means is connected in a fluid tight seal to said second zone recycle inlet; said at least one inlet of said second recycle conduit is connected in a fluid tight seal to said second zone recycle outlet; said at least one outlet in said second recycle conduit means is connected in a fluid tight seal to said first zone recycle inlet; whereby flow at least in part due to gravity can transfer hot metal from said first zone to said second zone and back; and wherein said first zone pressure regulating means and said second zone pressure regulating means are attached, respectively, to said first zone gas outlet means and said second zone gas outlet means in fluid tight seals respectively control pressure in said first and second zone means wherein molten metal level within each said first and second zone means are controlled as is pressure both within said first and said second zone means.

7. The plant of claim 6, wherein there is an additional means for introducing a gas under pressure in a downward direction into said second recycle conduit.

8. The plant of claim 6, wherein there is a means for heating walls of said at least one first zone, said at least one second zone, said first recycle conduit, and said second recycle conduit.

9. The plant of claim 7, wherein there is a molten tap means for removing molten material from said first zone means means under controlled flow and pressure.

10. The plant of claim 6, wherein said first zone pressure regulating means of said first zone and said second zone pressure regulating means of said second zone comprising a heat exchanger means for indirect heat exchange with any gases existing from said first zone and said at least one second zone, respectively.

* * * * *